April 25, 1939.  R. H. OWENS  2,156,161
SEALING DEVICE
Filed April 10, 1937  4 Sheets-Sheet 3

INVENTOR
Robert H. Owens
BY
Marechal & Noe
ATTORNEY

April 25, 1939.  R. H. OWENS  2,156,161
SEALING DEVICE
Filed April 10, 1937    4 Sheets-Sheet 4

INVENTOR
Robert H. Owens
BY
Marechal & Noé
ATTORNEY

Patented Apr. 25, 1939

2,156,161

UNITED STATES PATENT OFFICE 2,156,161

SEALING DEVICE

Robert H. Owens, Connersville, Ind., assignor to Roots-Connersville Blower Corporation, Connersville, Ind., a corporation of Indiana Application April 10, 1937, Serial No. 136,106

7 Claims. (Cl. 286—7)

This invention relates to sealing devices for shafts.

One object of the invention is to provide an efficient seal for an operating shaft of a pump or the like, in which an effective seal is provided when the shaft is stopped.

A further object is to provide a convenient and efficient stationary sealing device which can be selectively and readily put into operation or out of operation when desired.

Still another object is to provide an efficient and easily operated stationary seal for a normally rotating shaft to seal the shaft when it is not running.

Other objects and advantages will be apparent from the following description, the accompanying drawings, and the appended claims.

In the drawings, in which a preferred embodiment of the invention is shown,

Fig. 7 is a fragmental elevational view showing one form of seal impeller;

Figure 1:
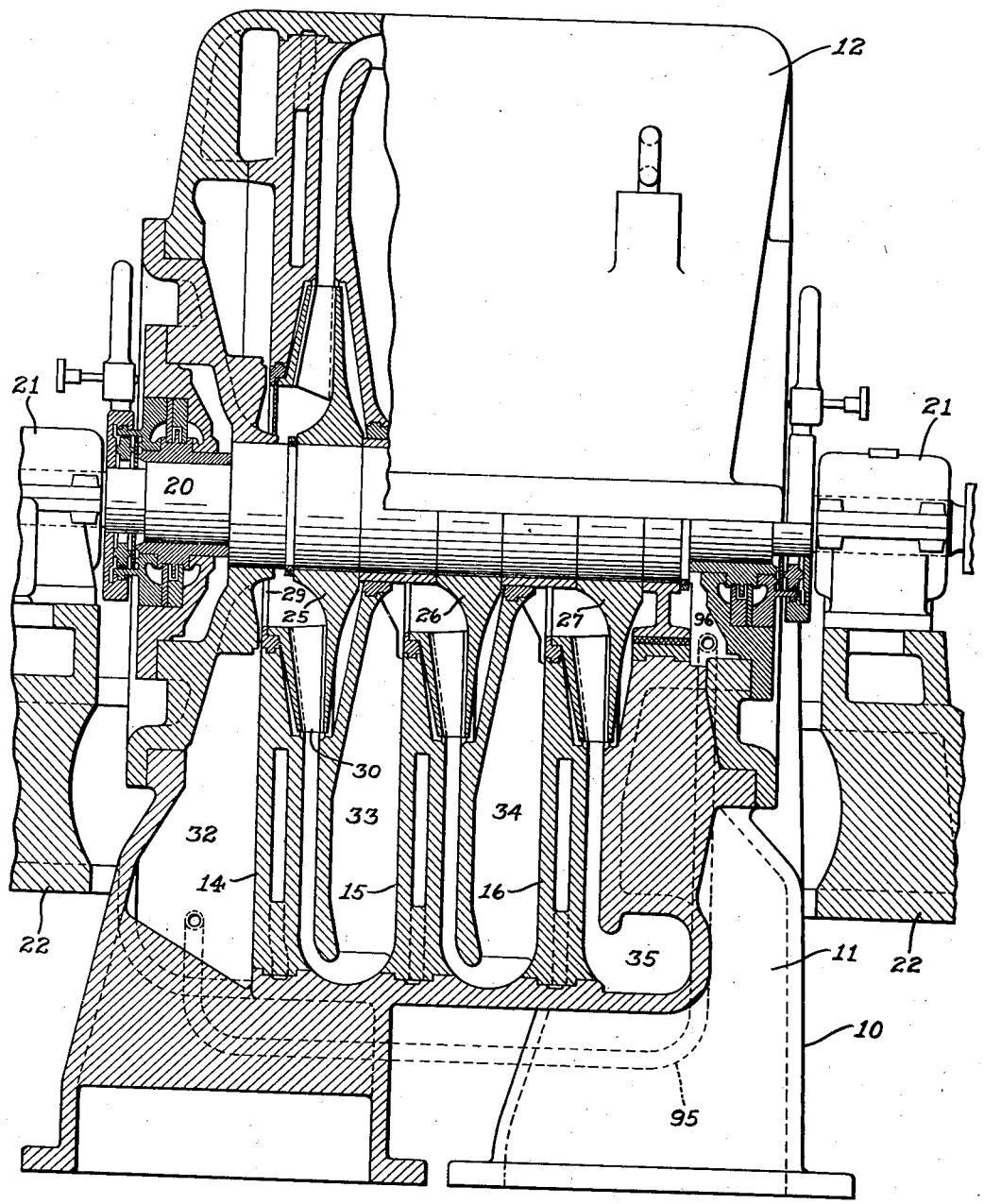
Fig. 1 is a view, partly in vertical section and partly in elevation, and showing a compressor pump embodying the present invention.

The invention is illustrated herein as incorporated in a fluid compressor of the multi-stage type, but it will be obvious that the invention can be applied to many other forms of apparatus. Referring particularly to Fig. 1, there is shown a multi-stage compressor having a casing indicated generally at 10 and comprising a lower or base portion 11, and an upper separable portion 12. The interior of the casing, in the embodiment shown, is divided by a series of vertical partitions 14, 15 and 16 into separate compartments for the various compression stages. Shaft 20 is rotatably mounted in casing 10, being supported by outboard bearings 21, mounted on platforms 22 and adapted to be mounted on a suitable support, such as a bedplate. Supported on shaft 20 for rotation therewith are the pump rotors 25, 26 and 27, having axial inlets 29, and peripheral outlets 30. The rotor inlets and outlets are so arranged with respect to the various passages and partitions of the casing interior that each rotor receives air or gas from a preceding compartment, and compresses it and passes it on at a higher pressure to the next succeeding compartment.

The fluid to be compressed is fed into the compressor and into the first or low pressure entrance compartment 32. From here it passes into the central entrance opening 29 of rotor 25 and is thrown out under higher pressure through peripheral opening 30 into an intermediate pressure chamber 33. From here the fluid is subjected to a similar action by rotor 26, being further compressed and passed into the next compression chamber 34, from which it passes through rotor 27, and then leaves the compressor at the high pressure end passage 35.

Means are provided for sealing the shaft 20 against leakage of the fluid handled by the compressor, where the shaft passes through casing 10, this means being effective during operation of the compressor, and preferably such that there is no contact of the sealing parts during running. As ilustrated in Fig. 2 a centrifugal seal is employed, which maintains a liquid seal. A variety of liquids may be used, and in many instances it has been found satisfactory to use water as the sealing medium.

Figure 4:
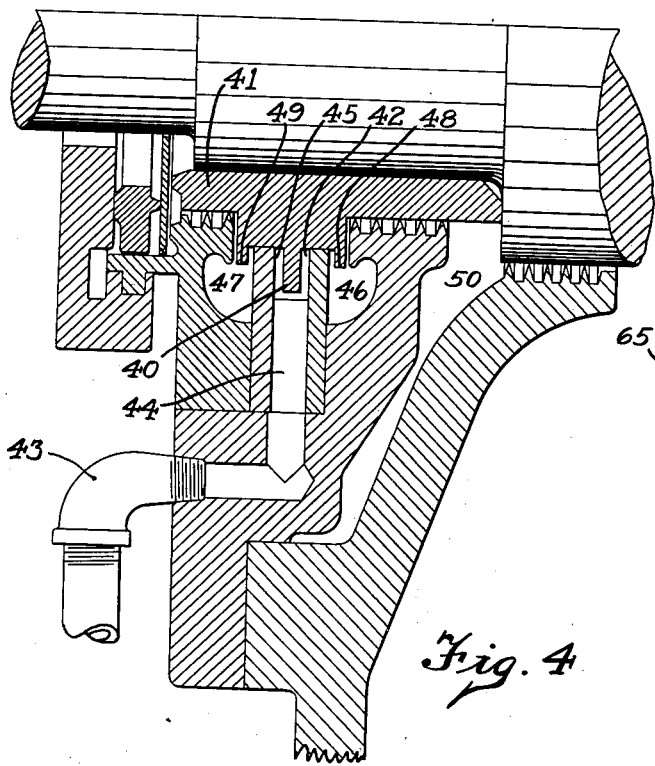
Fig. 4 is a sectional view taken on the line 4—4 of Fig. 3.

The centrifugal running seal comprises impeller 40, which rotates with the shaft, and is preferably integrally formed with sleeve 41 fast to the shaft. Impeller 40 rotates in a stationary pressure channel 42, to which suitable sealing liquid is supplied by pipe 43 and passage 44 (Fig. 4). Impeller 40 is so shaped and positioned with respect to pressure channel 42 that there is no contact between these parts. Rotation of impeller 40 develops pressure upon the liquid in channel 42 which is in excess of the pressure of the gas being compressed, and thus forms an effective gas seal. The sides 45 of sealing channel 42 extend inwardly to a close clearance position with sleeve 41, and thus restrict any undesired flow of the sealing liquid from channel 42 along the shaft.

The sealing liquid which overflows, preferably at a controlled small rate, from channel 42 is received in drain channels 46 and 47, which are formed in parts fixed to casing 10, and which are located on either side of pressure channel 42. An additional drain channel 50 is provided inwardly of drain channel 46, and liquid escaping from drain channel 46 can escape through supplementary drain channel 50. The trapping of overflow sealing liquid from pressure channel 42 is assisted by slinger rings 48 and 49 rotatable with shaft 20 and operating in drain channels 46 and 47, into which they throw the overflow sealing liquid. Slinger rings 48 and 49 are preferably formed integral with sleeve 41. It will be noted that slinger rings 48 and 49 have no contact with the parts of fixed drain channels 46 and 47, and since impeller 40 is also free of contact with pressure chamber 42, it will be apparent that the entire centrifugal seal operates without any contact between the fixed and the movable parts, and thus wear is avoided.

Figure 6:
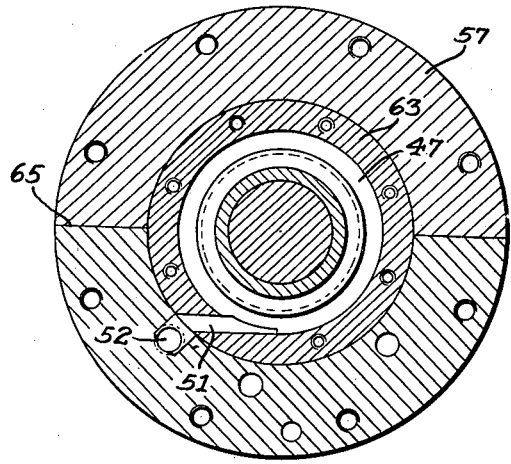
Fig. 6 is a sectional view taken on the line 6—6 of Fig. 2.
Figure 5:
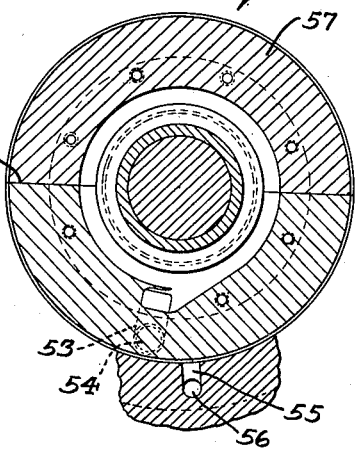
Fig. 5 is a sectional view taken on the line 5—5 of Fig. 2.

Suitable drain pipes and drain passages are provided which connect with the three drain channels. Outer drain channel 47 is drained by passage 51 (Fig. 6) and pipe 52. Inner drain channel 46 is drained by passage 53 (Fig. 5) and pipe 54. Supplementary drain channel 50 is drained by passage 55 and pipe 56. The sealing liquid drained from the various drain channels may be wasted, or provision may be made for recirculating it into pressure channel 42. When necessary, suitable traps are provided to prevent loss of pressure from the compressor through the various drain channels and passages.

Figure 2:
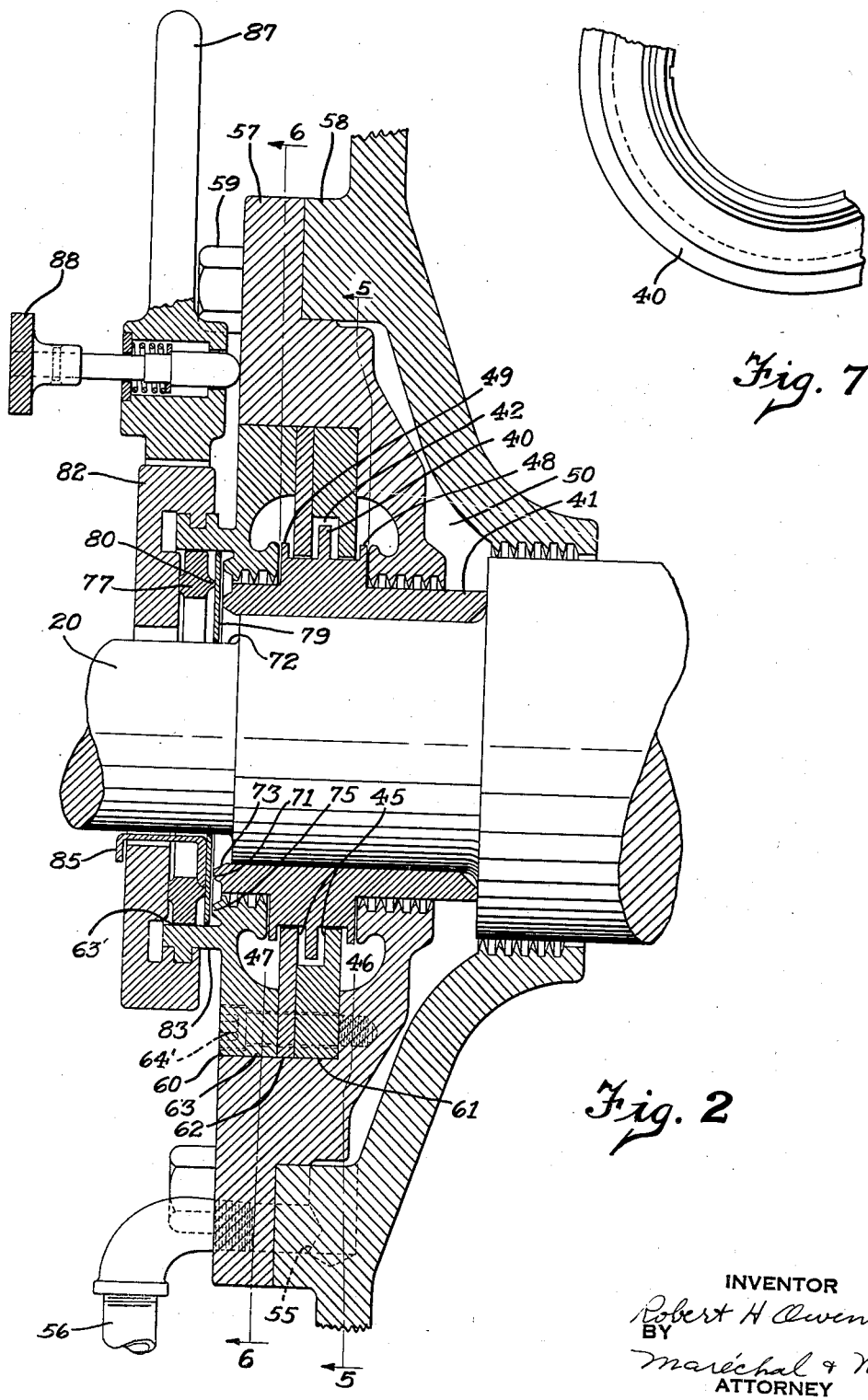
Fig. 2 is a detailed sectional view on an enlarged scale and taken on the line 2—2 of Fig. 3.

The construction of the parts which form the pressure channel 42, and the various drain channels, is best illustrated in Fig. 2, and includes an end plate 57, attached to outwardly projecting flange 58 formed integrally with casing 10. End plate 57 is suitably attached to casing 10 as by bolts 59, and its inner face is shaped to cooperate with casing 10 to form supplementary drain channel 50. End plate 57 is centrally recessed, as indicated at 60, and receives therein a series of disk-like members 61, 62 and 63, secured to end plate 57 as by screws 64. These parts are so formed that, when assembled, they provide the various channels above described. End plate 57, and disk-like members 61, 62 and 63 may be of split construction, for ready assembly, as shown at 65.

Means are provided for effectively sealing the shaft with respect to the casing when the shaft is stationary, and the liquid centrifugal seal thus ineffectual. This stationary sealing means is so constructed that the parts can be held out of contact during operation of the shaft, to prevent friction and wear. For the sealing of the shaft while stationary, a sealing surface 71 is provided on the shaft, another sealing surface 75 is provided on the casing, and a sealing member 79 is arranged to be brought into sealing position to seal these two surfaces. The sealing surface on the shaft is preferably of annular shape and located concentrically with the shaft, and is of small radial extent. As illustrated in Fig. 2 shaft sealing surface 71 is conveniently formed on the outer end of sleeve 41, and if desired, the diameter of shaft 20 may be reduced at this point as indicated at 72 to provide clearance for the sealing mechanism. Shaft sealing surface 71 is preferably a highly finished metal surface extending substantially transversely of the shaft. By tapering the outward ends of sleeve 41, as indicated at 73, the radial dimension of annular sealing surface 71 is made small, for maximum effectiveness.

The casing sealing surface, indicated at 75 is also preferably annular in form and of small radial extent, and is located in a position concentric with the shaft and with the shaft sealing surface 71, the two surfaces being aligned radially. Casing sealing surface 75 is generally similar in cross section and finish to shaft sealing surface 71, and is conveniently formed by a tapered annular projection integral with disk-like member 63. These two sealing surfaces are preferably spaced apart for cooperation with the pressure member 77 and sealing member 79.

Pressure member 77 has movement toward and away from sealing surfaces 71 and 75, and sealing member 79 is interposed between pressure member 77 and the sealing surfaces, and is loosely supported in position. Pressure member 77 has an annular contacting surface 80 formed thereon, and this contact portion 80 is substantially concentric with the shaft and the two sealing surfaces, and is preferably of such extent as to coincide with the space between the two sealing surfaces. Thus, when the pressure member is moved inwardly to operative position, contacting portion 80 applies pressure to the outer surface of sealing member 79 at a zone intermediate the two sealing surfaces, and the resulting even pressure distribution causes the loosely mounted sealing member 79 to adjust itself against the sealing surfaces insuring a tight seal.

Sealing member 79 may be of any suitable material capable of forming a tight seal with sealing surfaces 71 and 75. It is preferred however to form the sealing member as a metal disk, having an accurately finished plane surface to bear against the sealing surfaces.

Means are provided to move pressure member 77 and sealing member 79 into and out of operative position. Such means preferably take the form of a nut 82, which engages threads 83, which are conveniently formed on disk portion 63. These threads are formed concentric with the shaft and the parts of the stationary seal. Pressure member 77 and sealing member 79 are loosely received within recessed portion 63' formed in disk-like member 63 and concentric with the shaft, the fit of the parts being such as to maintain pressure member 77 and sealing member 79 substantially concentric with the shaft and the other seal parts, while permitting free axial movement. Members 77 and 79 are also loosely attached to nut 82 to provide for bodily movement therewith, to thus move the parts of the stationary seal out of contact during running. This construction also permits slight adjusting movements during closing of the seal so that the parts may adjust themselves to a sealing position of maximum effectiveness. This loose attachment is provided by a series of U-shaped brackets 85, which are suitably fastened to the outer face of sealing member 79, and which extend through the central opening in nut 82, and are outwardly turned to overlie the outer surface of nut 82, as best shown at 86 in Fig. 3. Suitable operating means are provided to move the sealing parts into and out of operative position, such as handle 87, attached to nut 82 for convenient rotation thereof. Formed in handle 87 is detent member 88 which cooperates with suitable apertures in end plate 57 for maintaining the seal in selected position. Adjustable stop means 89 is provided for association with handle 87 to adjustably determine the movement of the parts to sealing position.

If desired, means may be provided for the equalization of the pressure against which the seals at the input and output ends operate, thus making it possible to use seals of substantially identical design and construction at both the low pressure and high pressure ends of the compressor. Such means may take the form of a small external pipe 95, which connects the input chamber 32 to area 96, located immediately inwardly of the seal at the output end.

Figure 3:
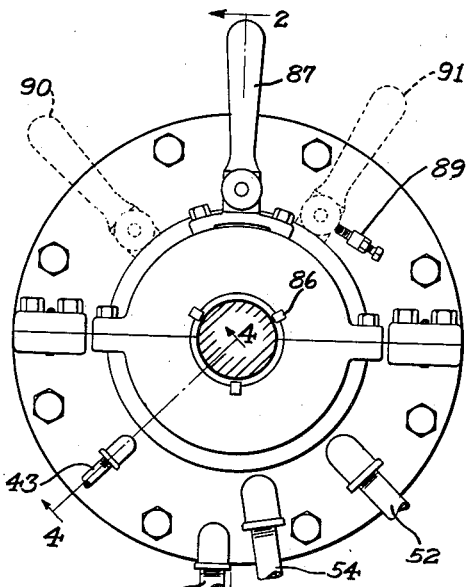
Fig. 3 is an end elevational view of the sealing mechanism.

In operation, when the compressor or booster is shut down, detent 88 is released, and handle 87 is moved from running position, indicated at 90 in Fig. 3, to closed position indicated at 91. This latter position being determined by the setting of stop means 89. As will now be obvious from the above description this movement of the handle rotates nut 82 and moves pressure member 77 inwardly, carrying with it sealing member 79. As the parts approach sealing position, sealing member 79 adjusts itself so as to best contact sealing surface 71 on shaft 20, and sealing surface 75 on casing 10. Further inward movement forces sealing member 79 into tight sealing relationship between the parts, and the relative spacing of the two sealing surfaces and the contact part 80 is such that an even distribution of pressure on sealing member 79 can take place, insuring a tight seal.

Figures 8, 9:
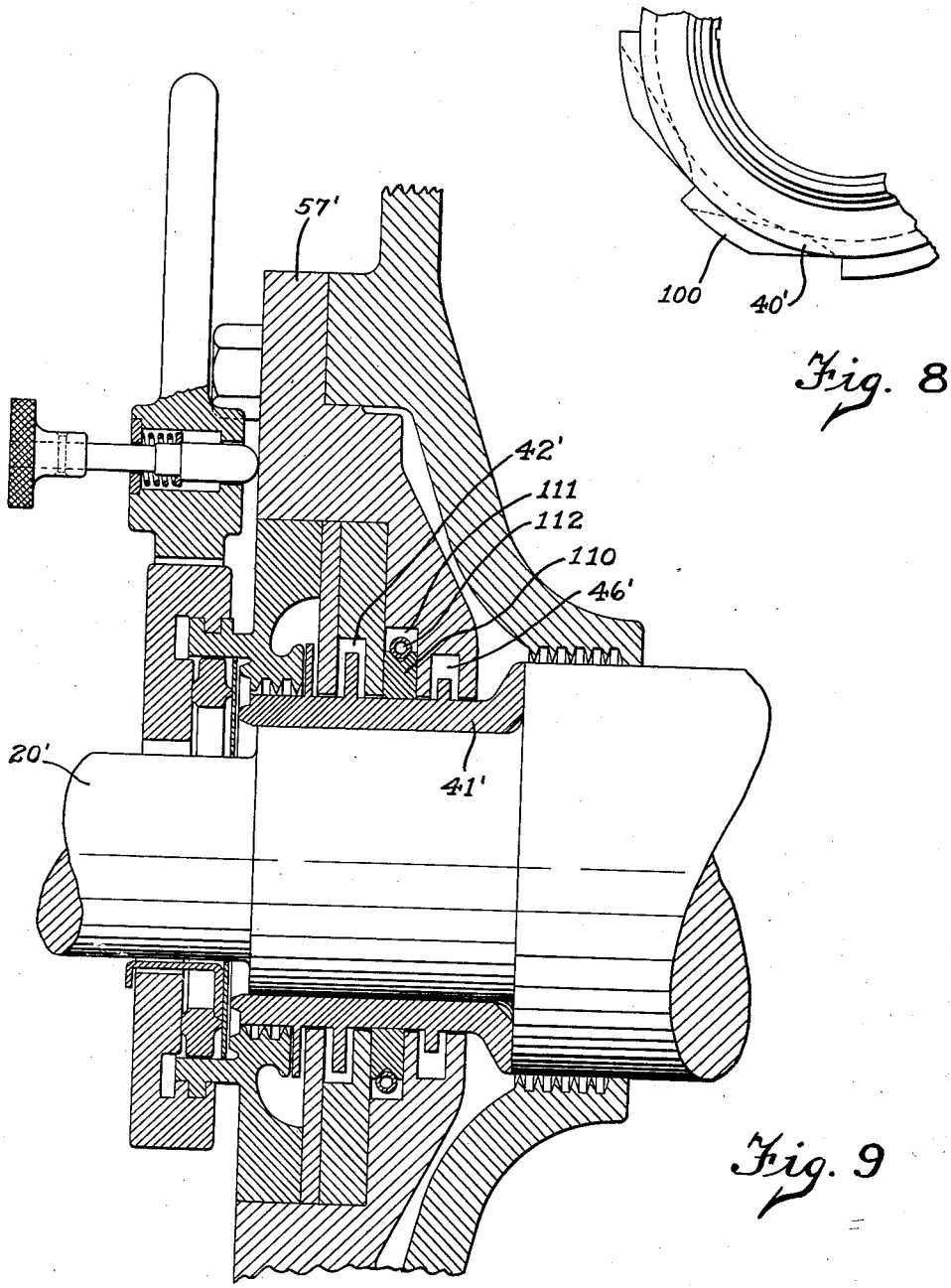
Fig. 8 is a view similar to Fig. 7 and showing a modified form of impeller.
Fig. 9 is a view similar to Fig. 2, but showing a somewhat modified form of the invention.

In Fig. 8, a slightly modified form of impeller for use in the pressure channel 42 of the running seal is shown. Ordinarily, impeller 40 will develop sufficient pressure when formed as a smooth-sided ring, as illustrated particularly in Fig. 7. When the booster is designed for extreme pressure conditions, however, it is sometimes desirable to use a form of impeller which will develop a greater sealing pressure. Such an impeller is shown in Fig. 8, in which impeller 40' carries radially extending teeth 100 which engage the sealing fluid and generate a high pressure.

Under some operating conditions, it becomes important that the sealing fluid be kept substantially completely out of contact with the interior of the compressor or booster, as for example where absorption of the sealing liquid by the gas being compressed is undesirable. Under such condition, a slight modification of the running seal, as illustrated in Fig. 9, may be employed. As illustrated in Fig. 9, flow retarding means are interposed between sealing pressure channel 42' and inner drain channel 46'. Such means may conveniently take the form of a series of segments 110, positioned around shaft 20' and received in recess 111 formed in end plate 57'. These segments are so proportioned that when assembled to form a ring their inner surfaces have a very slight clearance with sleeve 41' on shaft 20'. Yieldable means are provided for holding the segments in their assembled position, and as illustrated such means may take the form of a spiral or garter spring 112. These segments may be formed of any suitable material, such as carbon. The operation of the modification shown in Fig. 9 is in other respects similar to that shown in the other figures.

While the forms of apparatus herein described constitute preferred embodiments of the invention, it is to be understood that the invention is not limited to these precise forms of apparatus, and that changes may be made therein without departing from the scope of the invention which is defined in the appended claims.

What is claimed is:

1. Apparatus of the character described comprising a casing, a shaft extending through said casing, means operable to maintain said casing and said shaft in sealed relationship when said shaft is at rest and comprising an annular sealing surface on said shaft concentric therewith, an annular sealing surface on said casing concentric with and surrounding said first named sealing surface and aligned therewith in spaced relationship, a sealing member adapted to be moved into contact with the sealing surfaces on said casing and said shaft, and means for pressing said sealing member into sealing relationship with said sealing surfaces, said last named means including a pressure member shaped and positioned to applying pressure to a zone on said sealing member in alignment with the space between said sealing surfaces.

2. Apparatus of the character described comprising a casing, a shaft operable in said casing, a sealing surface on said casing, a sealing surface on said shaft and adjacent the casing sealing surface, a sealing member adapted to have sealing contact with the sealing surfaces on said casing and said shaft, a movable pressure member operable to hold said sealing member in sealing contact with said casing and shaft surfaces when said pressure member is in operative position, means for moving said pressure member into and out of operative position, and means supporting said sealing member for adjusting movements relative to said sealing surfaces when said pressure member is moved into operative position to provide complete sealing contact between said sealing member and said sealing surfaces, and a member connected to said sealing member adapted to be engaged by said first means when adjusted to move the pressure member out of operative position to positively withdraw the sealing member from the sealing surfaces.

3. Apparatus of the character described comprising a casing, a shaft operable in said casing, a sealing surface on said casing, a sealing surface on said shaft adjacent the casing sealing surface, a sealing member adapted to have sealing contact with the sealing surfaces on said casing and said shaft, a movable pressure member operable to hold said sealing member in sealing contact with said casing and shaft surfaces when said pressure member is in operative position, means for moving said pressure member into and out of operative position, and means for loosely supporting said sealing member between said pressure member and said sealing surfaces to provide for aligning movements of said sealing member when said pressure member is moved to operative position.

4. Apparatus of the character described comprising a casing, a shaft operable in said casing, a sealing surface on said casing, a sealing surface on said shaft and adjacent the casing sealing surface, a sealing member adapted to have sealing contact with the sealing surfaces on said casing and said shaft, a movable pressure member operable to hold said sealing member in sealing contact with said casing and shaft surfaces when said pressure member is in operative position, means for moving said pressure member into and out of operative position, and means for loosely attaching said sealing member to said last named means and between said pressure member and said sealing surfaces to provide for aligning movements of said sealing member when the parts are moved to sealing position, and to provide for withdrawal of said sealing member from contact with said sealing surfaces when said pressure member is moved out of operative position.

5. Apparatus of the character described comprising a casing, a shaft extending through said casing, a sealing surface on said casing, a sealing surface on said shaft in alignment with and spaced from the sealing surface on said casing, a sealing member having a sealing face adapted to have sealing contact with said surfaces, means adapted to engage the side of said sealing member opposite said sealing face and with the engagement limited to an area aligned with the space between said sealing surfaces, and means for applying pressure to said last named means to produce a sealing contact between said sealing member and said sealing surfaces.

6. A stationary shaft and casing seal of the character described comprising a narrow annular sealing surface on said shaft and concentric therewith, a narrow annular sealing surface on said casing concentric with and surrounding said first named sealing surface and aligned therewith in spaced relationship, a sealing member adapted to be moved into contact with the sealing surfaces on said casing and shaft, and means for applying pressure to said sealing member to press it into sealing relationship with said sealing surfaces, means for loosely attaching said sealing member to said pressure applying means to provide for aligning movements of said sealing member when the parts are moved to sealing position, said pressure applying means including a pressure member having a narrow annular face dimensioned and positioned to apply pressure to a zone on said sealing member in alignment with the space between said sealing surfaces to distribute pressure on said sealing member and tightly seal the parts.

7. In apparatus of the character described having a casing member and a shaft member rotatably mounted therein, means operable to maintain said casing member and said shaft member in sealed relation when said shaft member is at rest comprising a thin metal disk having a smooth metallic sealing face, means on one of said members annularly engaging said disk and comprising a smooth hard sealing surface, means on the other member annularly engaging said disk, a pressure plate movable into operative engagement with said disk upon the side opposite said sealing face and at a zone radially spaced from said disk-engaging means, said disk being arranged between said pressure plate and said disk-engaging means for movement towards said disk-engaging means, and rotatable means for moving said pressure member against said disk to seal said disk and said disk-engaging means.

ROBERT H. OWENS.